United States Patent [19]

Penick, Jr.

[11] Patent Number: 5,092,641
[45] Date of Patent: Mar. 3, 1992

[54] CABLE LOCKING AND SEALING DEVICE

[75] Inventor: Clarence A. Penick, Jr., Hudson, Ind.

[73] Assignee: Brammal, Inc., Angola, Ind.

[21] Appl. No.: 697,590

[22] Filed: May 9, 1991

[51] Int. Cl.⁵ ............................................... B65D 55/06
[52] U.S. Cl. ............................. 292/307 R; 24/136 A; 292/DIG. 61
[58] Field of Search ............... 292/307 R, 342, 323, 292/175, 163, 193, DIG. 61, DIG.36; 24/115 L, 136 A, 488

[56] References Cited

U.S. PATENT DOCUMENTS

| | | | |
|---|---|---|---|
| 534,706 | 2/1895 | Wright | 292/DIG. 61 X |
| 3,198,290 | 8/1965 | Di Maio | 24/136 A X |
| 3,770,307 | 11/1973 | Van Gompel | 292/307 R |
| 4,074,916 | 2/1978 | Schindler | 292/307 R |
| 4,747,631 | 5/1988 | Loynes et al. | 292/307 R |

Primary Examiner—Richard E. Moore
Attorney, Agent, or Firm—Hill, Van Santen, Steadman & Simpson

[57] ABSTRACT

A cable and locking and sealing device which has a body member to which one end of a cable is attached and the other end passes through a hasp so as to lock it and then the free end of the cable is inserted into the body member in a first direction, but it cannot be removed in the second direction. A disk rides upon a ramp to lock the second end so that it cannot be removed from the body member and in the present invention, a flexible O-ring of rubber or "NEOPRENE" or other flexible material serves as a spring to bias the disk upwardly along the ramp to lock the cable.

4 Claims, 1 Drawing Sheet

CABLE LOCKING AND SEALING DEVICE

BACKGROUND OF THE INVENTION

1. Field of the Invention

This invention relates in general to cable locking and sealing devices and in particular to a novel O-ring biasing means for biasing the disk up the ramp to lock a cable.

2. Description of Related Art

The assignee of the present invention is the owner of U.S. Pat. Nos. 3,770,307, 4,074,916 and 4,747,631 which disclose cable locking and sealing devices. Such devices are used for sealing railway car doors, for example, by passing a cable through hasps such that one end of the cable is attached to a body member and after the cable has been passed through the hasps, the free end is inserted into the body member where it can be moved in a first direction, but cannot be removed from the body member due to the locking action of a disk which rides upon an inclined block.

SUMMARY OF THE INVENTION

The present invention provides a novel cable locking and sealing device which has a novel O-ring biasing device which biases a disk that rides up an inclined plane so as to lock the cable end. The O-ring biasing device can deform as the cable is moved in a first direction so as to allow the disk to move down the incline plane so that the cable can pass through the body member and then the flexible O-ring expands to bias the disk up the inclined ramp as the end of the cable is moved in the second direction so as to lock the cable to the body member.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 3:
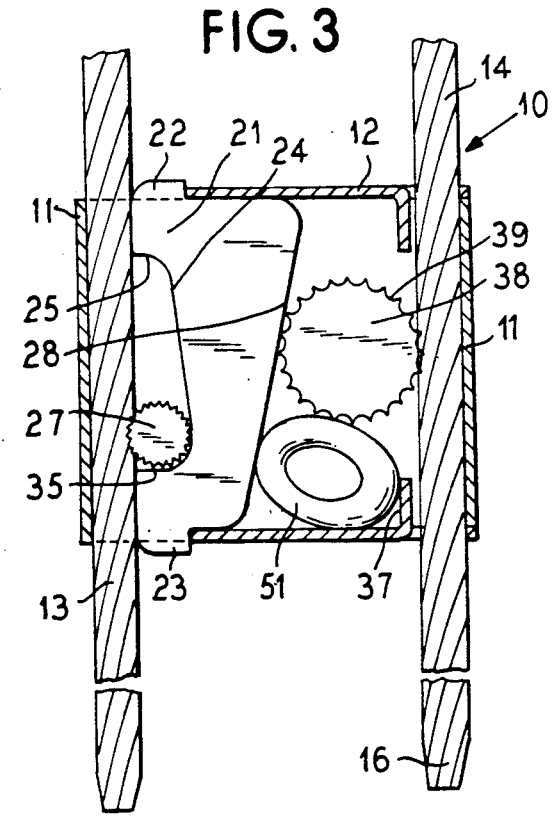
FIG. 3 is a sectional view through the invention.
Figure 4:
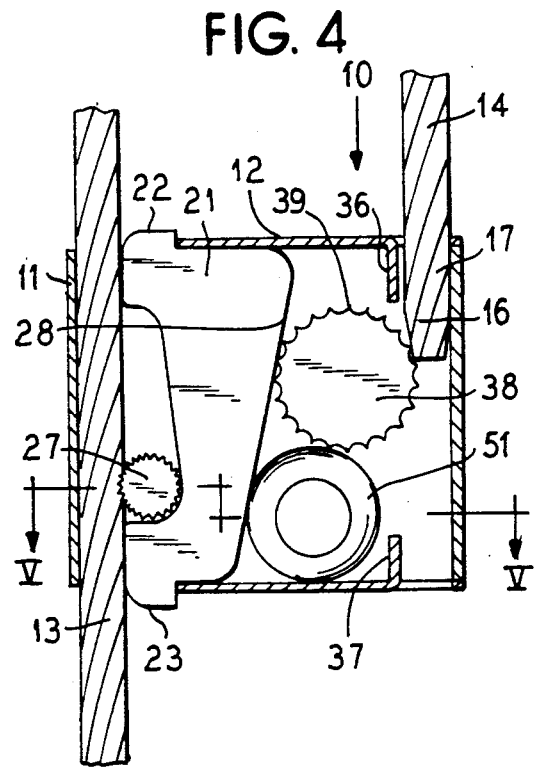
FIG. 4 is a sectional view illustrating the cable being initially inserted into the body member.

As shown by the drawings, the cable and sealing locking device of the invention 10 includes a first inner body 11 and a second outer body 12 which is received over the inner body member 11 as illustrated in FIGS. 1-5. A cable 13 passes through the body member 11 and is staked by staking indentions 18 so as to lock one end of the cable to the body member. A wedging member 21 is mounted within the body members 11 and 12 and has projections 22 and 23 which engage the body member 12 and the cable as best shown in FIGS. 3 and 4. A relatively small disk 27 is mounted between the cable 13 and an inclined ramp 24 formed on a first side of the wedging member 21 and the disk 27 engages the cable 13 so as to lock the cable relative to the body member. The staking indentation 18 also locks the cable 13 to the body member.

Figure 1:
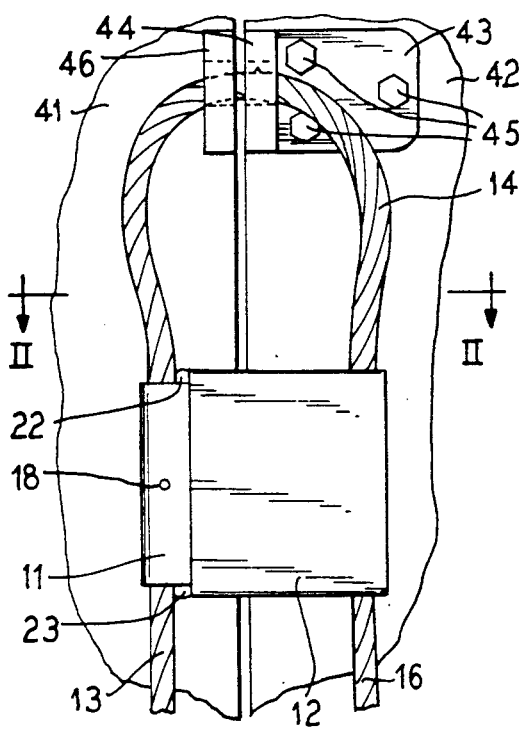
FIG. 1 is a plan view of the cable locking sealing device of the invention.
Figure 2:
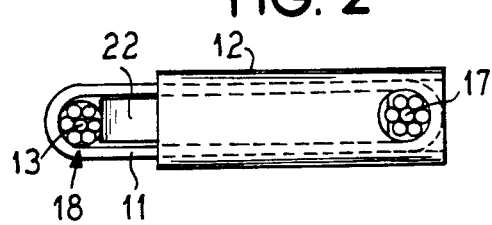
FIG. 2 is a sectional view taken on II—II from FIG. 1.
Figure 5:
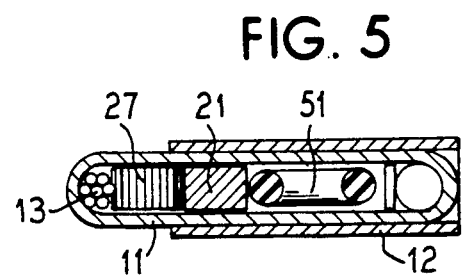
FIG. 5 is a sectional view taken on line V—V from FIG. 4.

As shown in FIG. 1, a portion of the cable 14 can be passed through hasps 44 and 46 to lock members 41 and 42 together. The hasps 46 and 44 are connected to members 41 and 42 respectively by means such as a plate 43 and bolts 45 which lock the hasp 44 to the member 42. Similarly, bolts and plate means are provided for locking the hasp 46 to the member 41. After the portion 14 of the cable has been passed through the hasps 46 and 44, its end 16 which is tapered is inserted into the opening formed in the body members 12 and 11 such that the end 17 engages a toothed disk 38 so as to rotate in the clockwise direction relative to FIGS. 3 and 4 down an incline 28 formed on the wedging member 21. The inclined plane 28 may be provided with teeth to mate with the teeth 39 on the disk 38 if desired. The disk 38 is biased by a flexible O-ring 51 which is mounted so as to bias the disk upwardly along the inclined plane 28 relative to FIGS. 3 and 4 so as to lock the cable 14 to the body member so that it cannot be pulled upwardly relative to FIGS. 3 and 4 after being inserted into the body member.

The outer body member 12 is formed with depressed portions 36 and 37 illustrated in FIGS. 3 and 4 so as to allow the end 16 of the cable to be inserted into the body member.

The flexible O-ring 51 may be made of rubber, "NEOPRENE" or other suitable material and may be a type number 2-203 Parker "O" ring, for example.

A shown in FIG. 3, as the end 16 of the cable portion 14 is pulled downwardly relative to the body member 12, the disk 38 moves down along the inclined plane 28 to allow the cable to pass downwardly through the body member. As the disk 38 moves downwardly in the body member relative to FIG. 3, it compresses the flexible O-ring 51 as shown in FIG. 3 and the O-ring is held between the disk, the projection 37, the bottom of the body member 12 and the inclined plane portion 28 of the wedging member 21. The deformation in the O-ring 51 provides a bias in the up direction relative to FIG. 3 on the disk 38 such that when downward movement of the cable portion 16 is terminated the disk 38 will be biased up the inclined plane 28 and thus will move to the right relative to FIG. 3 to lock the cable 14 between the disk 38 and the body portion 11. This prevents the cable 14 from being withdrawn from the body members 11-12 in the upward direction because when the cable 14 is pulled upwardly relative to FIG. 3, the disk 38 tends to move to the right as it travels along the inclined 28 thus causing tighter locking of the cable to the body members.

The flexible O-ring 51 results in a simpler device than the prior art structure which is a metal spring.

The size of the O-ring 51 is selected such that in cooperation with the wedging member 21 inclined plane 28 and disk 38 it properly biases the disk 38 into the locking position and still allows the cable portion 14 to be moved in the downward direction relative to FIG. 3.

Although the invention has been described with respect to preferred embodiments, it is not to be so limited as changes and modifications can be made which are within the full intended scope of the invention as defined by the appended claims.

I claim as my invention:

1. A cable lock and seal device comprising, a body member formed with first and second openings, a cable with a first end fixedly mounted in said body member adjacent said second opening, a wedging member mounted in said body member adjacent said second opening, an inclined ramp formed on said wedging member on the side facing said second opening, a disk shaped member engageably with said inclined ramp and mounted between said wedging member and said second opening such that the second end of said cable can be inserted into said second opening of said body member in a first direction so as to move said disc along said inclined ramp to make said second opening larger, and such that when said second end of said cable is moved in a direction opposite to said first direction said disc moves along said ramp to make said second opening smaller to lock said cable to said body member, and a flexible annular member mounted between said disc and said body member so as to bias said disk in said direction opposite to said first direction.

2. A cable lock and seal device according to claim 1 wherein said flexible annular member is an O-ring.

3. A cable lock and seal device according to claim 2 wherein said O-ring is made of rubber.

4. A cable lock and seal device according to claim 2 wherein said O-ring is made of "NEOPRENE".

* * * * *